(12) United States Patent
Yu et al.

(10) Patent No.: US 10,866,394 B2
(45) Date of Patent: Dec. 15, 2020

(54) OPTICAL SYSTEM

(71) Applicant: TDK TAIWAN CORP., Taoyuan (TW)

(72) Inventors: Cheng-Kai Yu, Taoyuan (TW);
Liang-Ting Ho, Taoyuan (TW);
Shu-Shan Chen, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 327 days.

(21) Appl. No.: 15/953,968

(22) Filed: Apr. 16, 2018

(65) Prior Publication Data

US 2018/0299651 A1 Oct. 18, 2018

Related U.S. Application Data

(60) Provisional application No. 62/486,630, filed on Apr. 18, 2017.

(30) Foreign Application Priority Data

Apr. 4, 2018 (CN) .......................... 2018 1 0300537

(51) Int. Cl.
*G02B 13/00* (2006.01)
*H02K 41/035* (2006.01)
(Continued)

(52) U.S. Cl.
CPC .......... *G02B 13/0065* (2013.01); *G02B 7/09* (2013.01); *G02B 27/646* (2013.01); *H02K 41/0354* (2013.01)

(58) Field of Classification Search
CPC .... G02B 19/0028; G02B 17/086; G02B 5/04; G02B 17/08; G02B 17/0856; G02B 19/0066; G02B 7/021; G02B 13/06; G02B 15/173; G02B 19/0042; G02B 19/0061; G02B 7/025; G02B 7/10; G02B 7/1805; G02B 17/002; G02B 17/0892; G02B 3/08; G02B 7/023; G02B 13/007; G02B 13/16; H04N 5/2254; H04N 2101/00;
(Continued)

(56) References Cited

U.S. PATENT DOCUMENTS

2012/0099201 A1* 4/2012 Chan .................... G02B 27/646
359/557
2013/0258475 A1* 10/2013 Lee ......................... G03B 5/00
359/554

(Continued)

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

An optical system is provided, including a first optical module, a second optical module, and an optical path adjusting mechanism. The first and second optical modules are respectively configured to sustain a first optical element and a second optical element which respectively have a first optical axis and a second optical axis perpendicular to each other. The first optical module has a first electromagnetic driving assembly. The optical path adjusting mechanism, disposed between the first and second optical modules, allows light to enter the second optical module which includes an optical path adjusting unit and a second electromagnetic driving assembly which are arranged in the incident direction of light.

20 Claims, 8 Drawing Sheets

1

(51) Int. Cl.
*G02B 27/64* (2006.01)
*G02B 7/09* (2006.01)

(58) Field of Classification Search
CPC ............ H04N 5/2257; H04N 5/23238; H04N 13/324; H04N 13/327; H04N 13/334; H04N 13/337; H04N 13/341; H04N 13/363; H04N 1/02855; H04N 1/0306; H04N 1/0312; H04N 1/0313; H04N 1/0315; H04N 1/0318; H04N 2007/145; H04N 21/42203; H04N 21/4223; H04N 21/4788; F21V 5/04; F21V 7/0091; F21V 13/04; F21V 31/005; F21V 5/045; F21V 19/02; F21V 23/005; F21V 29/70; F21V 5/007; F21V 13/02; F21V 29/505; F21V 29/71; F21V 29/763; F21V 3/00; F21V 5/002; F21V 5/048
See application file for complete search history.

(56) References Cited

U.S. PATENT DOCUMENTS

| | | | |
|---|---|---|---|
| 2014/0177056 A1* | 6/2014 | Hayashi | G02B 7/09 359/557 |
| 2017/0168314 A1* | 6/2017 | Chan | G02B 7/023 |
| 2017/0329111 A1* | 11/2017 | Hu | H04N 5/23296 |
| 2018/0259741 A1* | 9/2018 | Inagaki | G02B 7/09 |

* cited by examiner

OPTICAL SYSTEM

CROSS REFERENCE TO RELATED APPLICATIONS

This application claims benefit of U.S. Provisional Application No. 62/486,630, filed on Apr. 18, 2017, and China Patent Application No. 201810300537.8, filed on Apr. 4, 2018, the entirety of which is incorporated by reference herein.

BACKGROUND OF THE INVENTION

Field of the Invention

The application relates in general to an optical system, in particular to an optical system including a plurality of optical modules and an optical path adjusting mechanism.

Description of the Related Art

Thanks to ongoing technological developments, recent electronic devices (such as tablet computers and smartphones) usually include a lens module capable of aiding in photography or recording video, or are even equipped with dual lens modules, bringing users a wealth of visual enjoyslent. However, an image may come out blurry if the user shakes the lens module in the electronic device when using it. To improve image quality, it is increasingly important to design a smaller and effectively shockproof lens module. In addition, people are currently pursuing miniaturization of devices equipped with dual lens modules. How to reduce the occupied space through special configuration design is an important issue.

BRIEF SUMMARY OF INVENTION

To address the deficiencies of conventional products, an embodiment of the invention provides an optical system configured to drive a plurality of optical elements, including a first optical module, a second optical module, and an optical path adjusting mechanism. The first and second optical modules are respectively configured to sustain a first optical element and a second optical element which respectively have a first optical axis and a second optical axis perpendicular to each other. The first optical module has a first electromagnetic driving assembly. The optical path adjusting mechanism is disposed between the first and second optical modules and allows light to enter the second optical module which includes an optical path adjusting unit and a second electromagnetic driving assembly that are arranged in the incident direction of light.

In some embodiments, the first electromagnetic driving assembly includes a first magnetic element, the second electromagnetic driving assembly includes a second magnetic element, and the magnetic pole directions of the first magnetic element and the second magnetic element are not parallel to each other. In some embodiments, the magnetic pole direction of the second magnetic element is parallel to the first optical axis. In some embodiments, the magnetic poles of the first magnetic element and the second magnetic element are perpendicular to each other. In some embodiments, the first magnetic element and the second magnetic element do not overlap when viewed from the direction perpendicular to the first optical axis. In some embodiments, the optical path adjusting mechanism further includes a permeability element disposed between the optical path adjusting unit and the second electromagnetic driving assembly.

In some embodiments, the optical path adjusting mechanism further includes a circuit hoard assembly and a position element, and the second electromagnetic driving assembly further includes a coil, wherein the position element and the coil are disposed on the circuit board assembly, and the second magnetic element is disposed on the optical path adjusting unit and corresponds to the coil. In some embodiments, the optical path adjusting mechanism further includes a holder and a base, the base is affixed to the circuit board assembly and configured to receive the holder, and the holder sustains the optical path adjusting unit. In some embodiments, the optical path adjusting mechanism further includes an elastic element disposed between the optical path adjusting unit and the holder, and the elastic element is connected to the optical path adjusting unit, the holder, and the base. In some embodiments, the holder and the base respectively have two inclined surfaces angled relative to the incident direction of the light, and the elastic element is disposed on the inclined surfaces. In some embodiments, the elastic element has a fixed portion and a movable portion respectively connected to the base and the holder, the fixed portion has two first string-out ends, and the movable portion has two second string-out ends, wherein the connection distance of the two first string-out ends are greater than the connection distance of the two second string-out ends. In some embodiments, the elastic element further includes a connecting portion connecting the fixed portion to the movable portion, and the connecting portion is perpendicular to the incident direction of the light and has a narrow portion, wherein the width of the narrow portion is smaller than the width of the junction between the connecting portion and the fixed portion and the junction between the connecting portion and the movable portion.

In some embodiments, the coil has a hollow portion, the position element is surrounded by the coil, and the coil and the position element share the second magnetic element. In some embodiments, the second electromagnetic driving assembly further includes a plurality of coils corresponding to the second magnetic element, and the coils are electrically independent of each other. In some embodiments, the position element is disposed between the coils. In some embodiments, the position element and the coil are disposed on the different surfaces of the circuit board assembly. In some embodiments, the circuit board assembly has a body board and a carrier board, wherein the coil is disposed on the body board, the position element is disposed on the carrier board, and the carrier board is angled relative to the incident direction of the light.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein haw the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
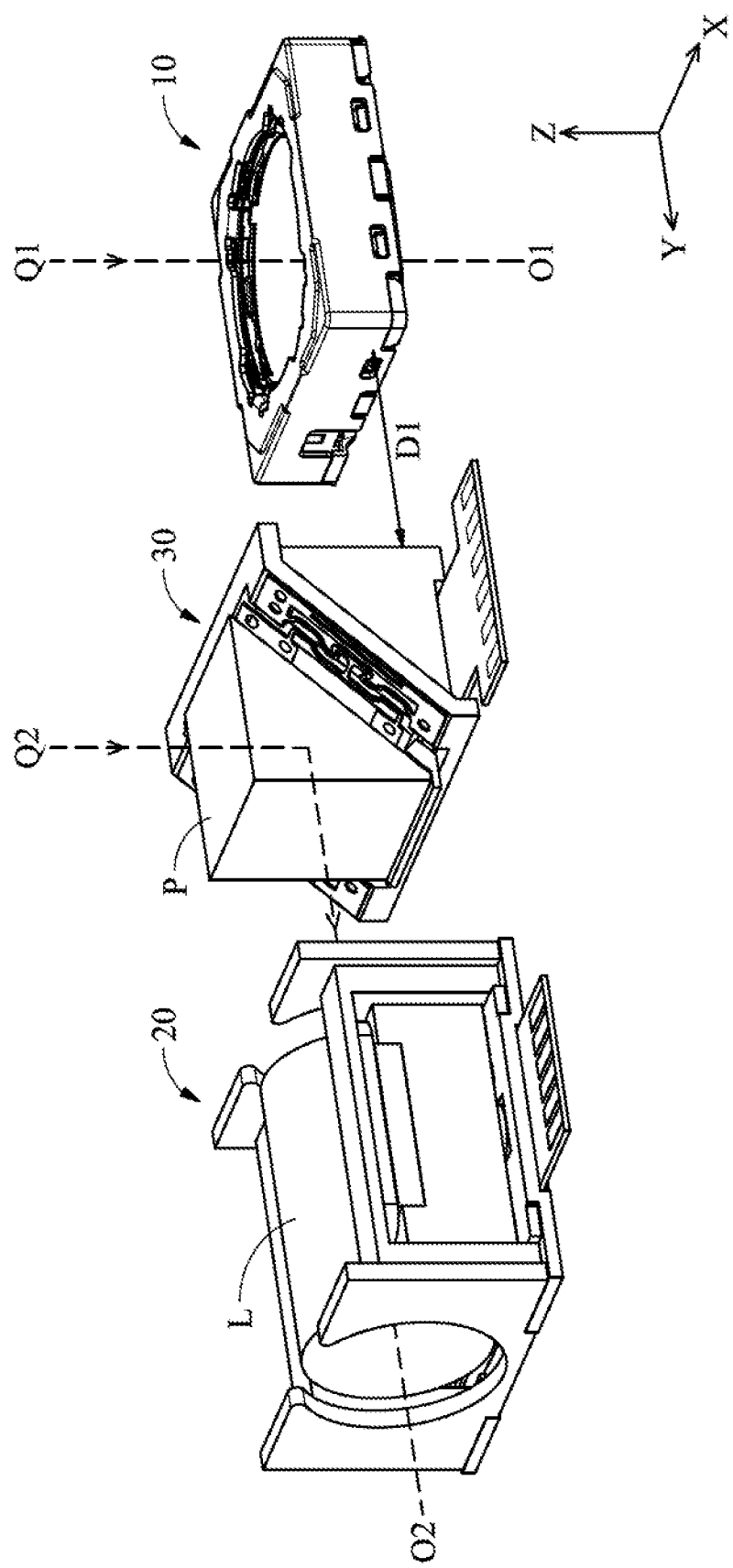
FIG. 1 is a schematic diagram of an optical system according to an embodiment of the invention.

FIG. 1 is a schematic diagram of an optical system 1 according to an embodiment of the present invention. The optical system 1 is, for example, a system that can drive and sustain dual optical elements (such as two lenses), and can be disposed inside an electronic device (such as a camera, tablet, or mobile phone). The optical system 1 primarily comprises a first optical module 10, a second optical module 20, and an optical path adjusting mechanism 30 (also called a light path adjusting mechanism) that are provided between the first and second optical modules 10 and 20 (in the Y-axis direction). The optical path adjusting mechanism 30 is configured to allow incident light to enter the second optical module 20. As shown in FIG. 1, when light (incident light) from the outside enters the optical system 1, the incident light Q1 (Z-axis direction) passes through a first optical element (for example, a lens; not shown) provided in the first optical module 10 to a photosensitive element (such as an image sensor; not shown) provided on the electronic device; and the incident light Q2 (Z-axis direction) is reflected by an optical path adjusting unit P (for example, a mirror or a prism) of the optical path adjusting mechanism 30) and enters the second optical module 20 in the direction of the Y-axis, so that the light can pass through a second optical element (for example, a lens) L of the second optical module 20 and to the photosensitive element in the electronic device to produce an image.

It is worth noting that the second optical axis O2 (substantially parallel to the Y-axis) of the second optical element L of the second optical module 20 is substantially perpendicular to the incident direction of the incident light Q1 and Q2 (and the first optical axis O1 of the first the first optical element), and the elements or components of the second optical module 20 can be arranged in a direction parallel to the Y-axis, so that the thickness of the electronic device in the Z-axis direction can be greatly reduced, aiding in miniaturization.

The aforementioned first optical element and second optical element L can be moved relative to the photosensitive element in the electronic device, and the focal length can be adjusted appropriately to achieve auto-focusing (AF) or optical image stabilization (OIS). Furthermore, by providing the optical path adjusting mechanism 30 to adjust the incident angle of light entering to the second optical element L, the image quality can be greatly improved. The structure and arrangement of the first and second optical modules 10 and 20 and the optical path adjusting mechanism 30 are described in detail below.

Figure 2A:
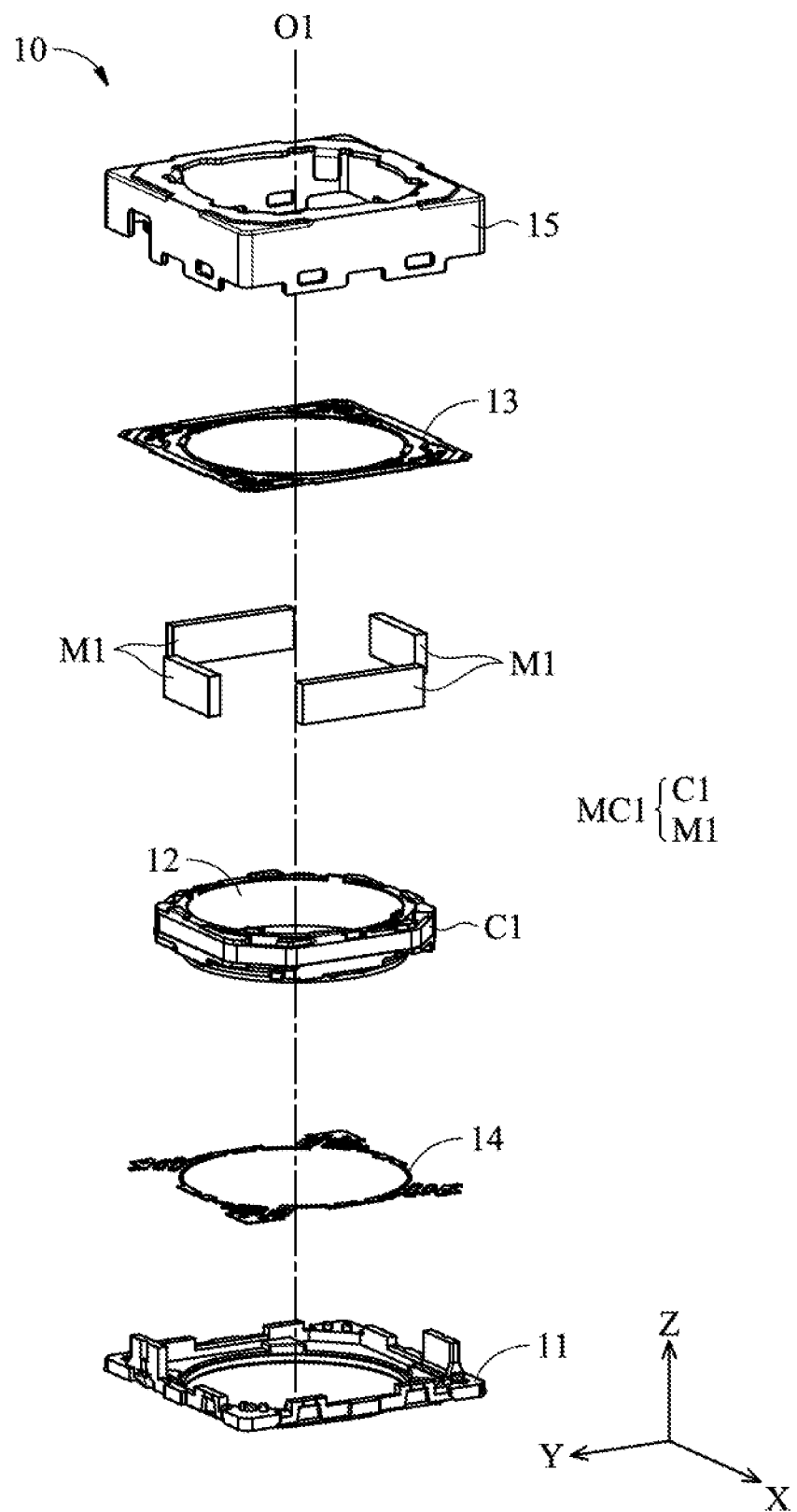
FIG. 2A is an exploded view diagram of the first optical module in FIG. 1, FIG. 2B an exploded view diagram of the second optical module and the optical path adjusting mechanism in FIG. 1

The structure of the first optical module 10 is described below first. Please refer to FIGS. 1 and 2A, wherein FIG. 2A shows an exploded view of the first optical module 10 in FIG. 1. The first optical module 10 primarily includes a base 11, a holder 12, an upper leaf spring 13, a lower leaf spring 14, a housing 15 (having a plastic material) and a first electromagnetic driving assembly MC1. The holder 12 sustains the first optical element (not shown; e.g., disposed in a bearing space of the holder 12), and the holder 12 is movable connected to the upper and lower leaf springs (e.g., having sheet structure) 13 and 14. The base 11 and the housing 15 are connected to each other. The first electromagnetic driving assembly MC1 includes a first coil C1 (or coil assembly) and a plurality of first magnetic elements M1 (e.g., magnets) configured to drive the holder 12 and the first optical element situated therein to move relative to the base 11, to achieve auto-focusing or optical image stabilization. The first coil C1 is disposed around on the holder 12, and the first magnetic element M1 is disposed on the base 11 and around the holder 12 and faces the first coil C1. An external power supply (not shown) applies a driving signal (for example, a driving current) to the first coil C1 to generate a magnetic force with the first magnetic element M1 to drive the holder 12 to move relative to the base 11. Moreover, the upper and lower leaf springs 13 and 14 allow the holder 12 to maintain an initial position relative to the base 11 before the driving signal is applied. In this embodiment, the first electromagnetic driving assembly MC1 is a moving-coil type; in another embodiment, it may be a moving-magnetic type.

Figure 2B:
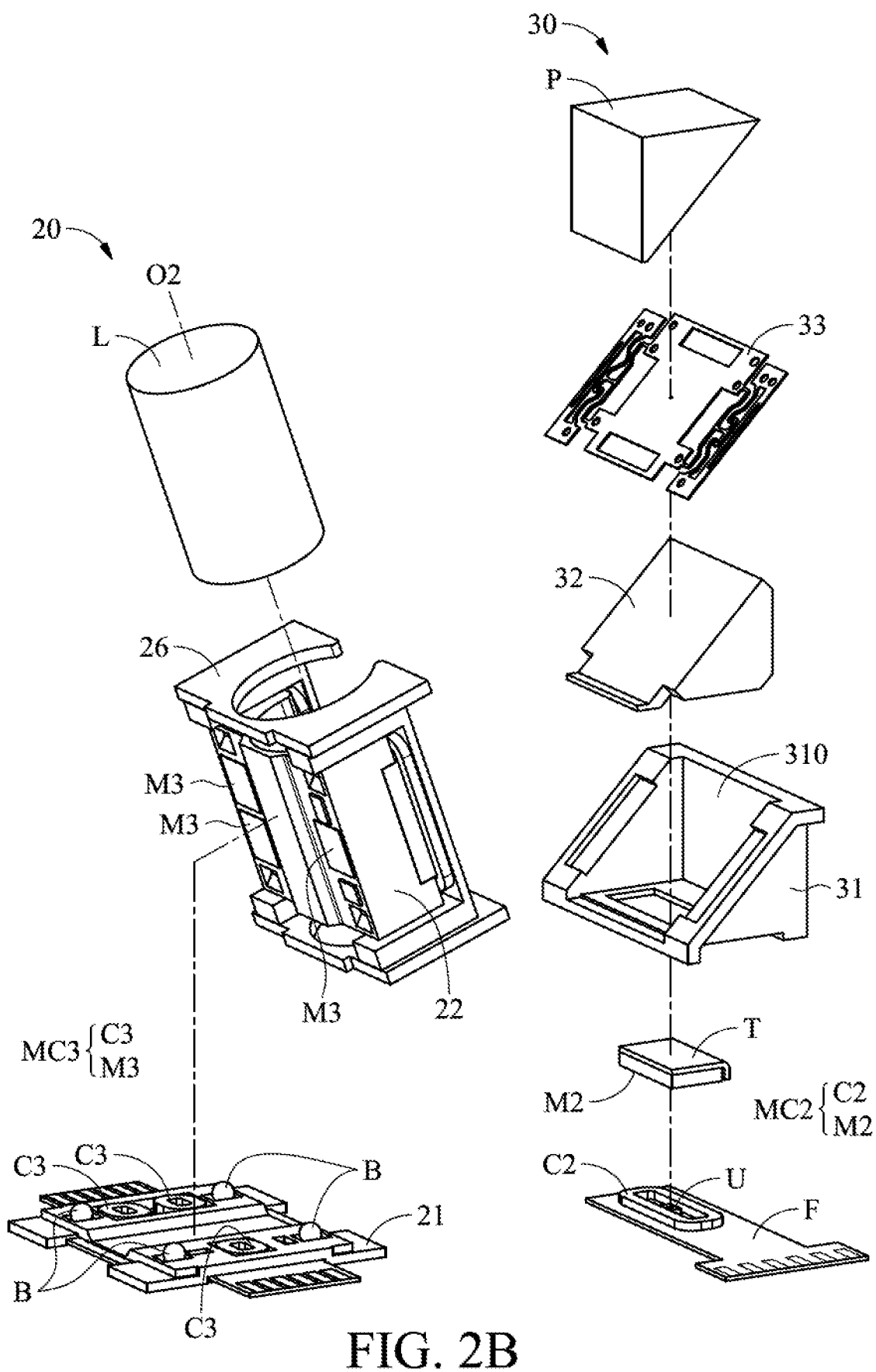

The mechanism and arrangement (configuration) of the second optical module 20 and the optical path adjusting mechanism 30 are described below. Please refer to FIGS. 1 and 2B, wherein FIG. 2B is an exploded view of the second optical module 20 and the optical path adjusting mechanism 30 in FIG. 1. The second optical module 20 primarily includes the second optical element L, a base 21, a holder 22, and a frame 26. The holder 22 sustains the second optical element L and is disposed on the base 21 and in the frame 26 which is affixed to the base 21. In some embodiments, the second optical module 20 may be provided with a connection assembly B and a third electromagnetic driving assembly MC3 between the base 21 and the holder 22. As shown in FIG. 2B, the connection assembly B is, for example, a rolling assembly so that the holder 22 can be movably connected to the base 21. The third electromagnetic driving assembly MC3 includes a plurality of third coils C3 (also called a coil assembly) and a plurality of third magnetic elements M3. The application of a driving signal (e.g., a driving current) causes the third electromagnetic driving assembly MC3 to force (or drive) the holder 22 and the second optical element L to move relative to the base 21 and the frame 26 (e.g., moving on the XY plane), to achieve the effect of focusing or optical image stabilization.

Figure 3:
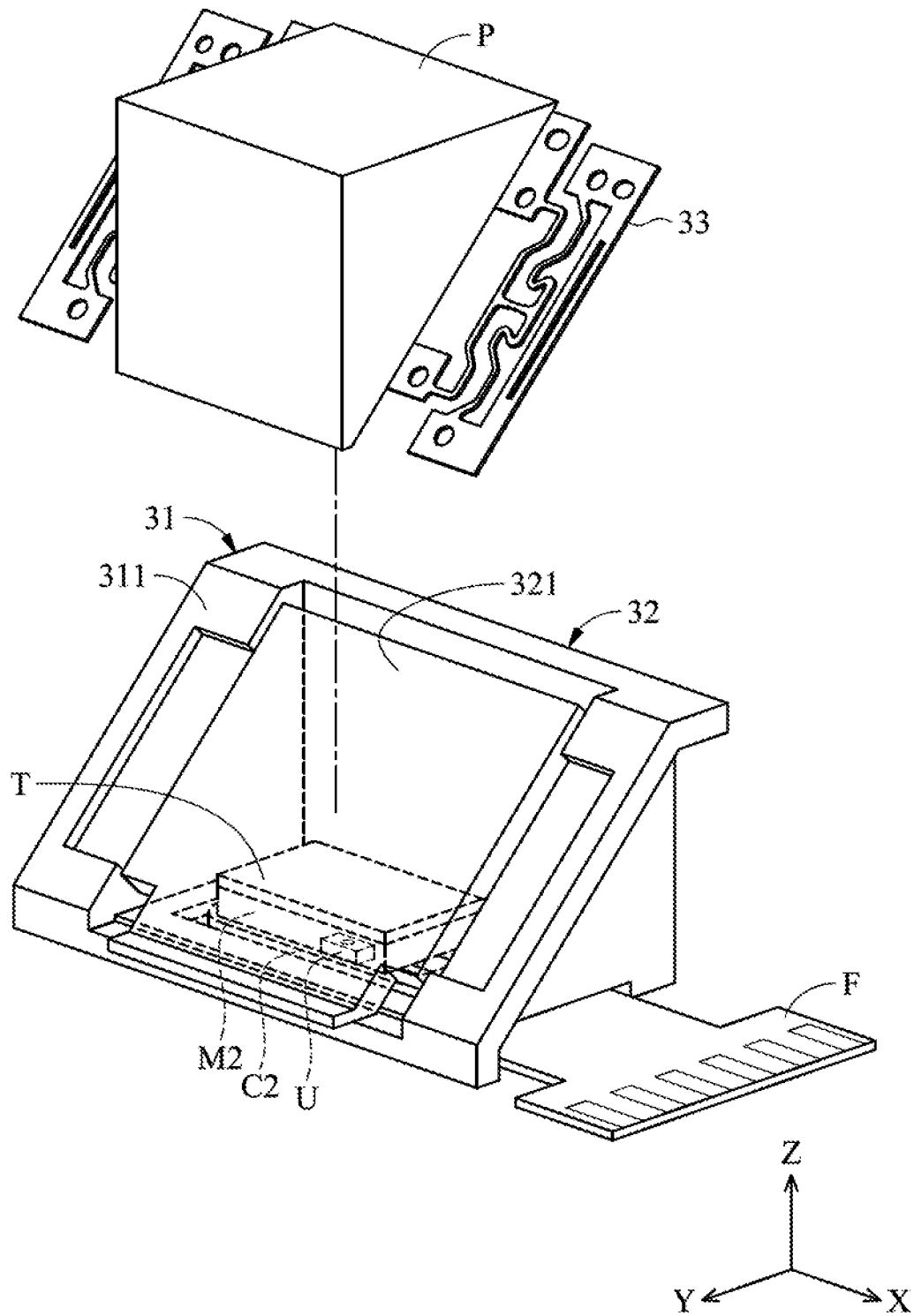
FIG. 3 is a schematic diagram of the optical path adjusting mechanism in FIG. 1.

Referring to FIGS. 1 and 2B, the aforementioned optical path adjusting mechanism 30 is configured to allow the incident light Q2 to either the second optical element L, which primarily includes the aforementioned optical path adjusting unit P, base 31, a holder 32, an elasticity element 33, a circuit board assembly F, and a second electromagnetic driving assembly MC2. Please refer to FIGS. 2B and 3, wherein FIG. 3 shows a schematic view of the optical path adjusting mechanism 30. The base 31 and the holder 32 are substantially triangular. The holder 32 is disposed in the receiving space 310 of the base 31, and the holder 32 is movably connected the base 31 via an elastic element (for example, a leaf spring) 33. In particular, the base 31 and the holder 32 respectively have inclined surfaces 311 and 321, and the elastic elements 33 are disposed on the two inclined surfaces 311 and 321 to connect the base 31 and the holder 32. The optical path adjusting unit P also is substantially triangular, and the holder 32 sustains the optical path adjusting unit P (which are affixed to each other). Specifically, the optical path adjusting unit P is disposed on the inclined surfaces 311 and 321, wherein the elastic element 33 is disposed between the optical path adjusting unit P and the base 31 and the holder 32.

Figure 4:
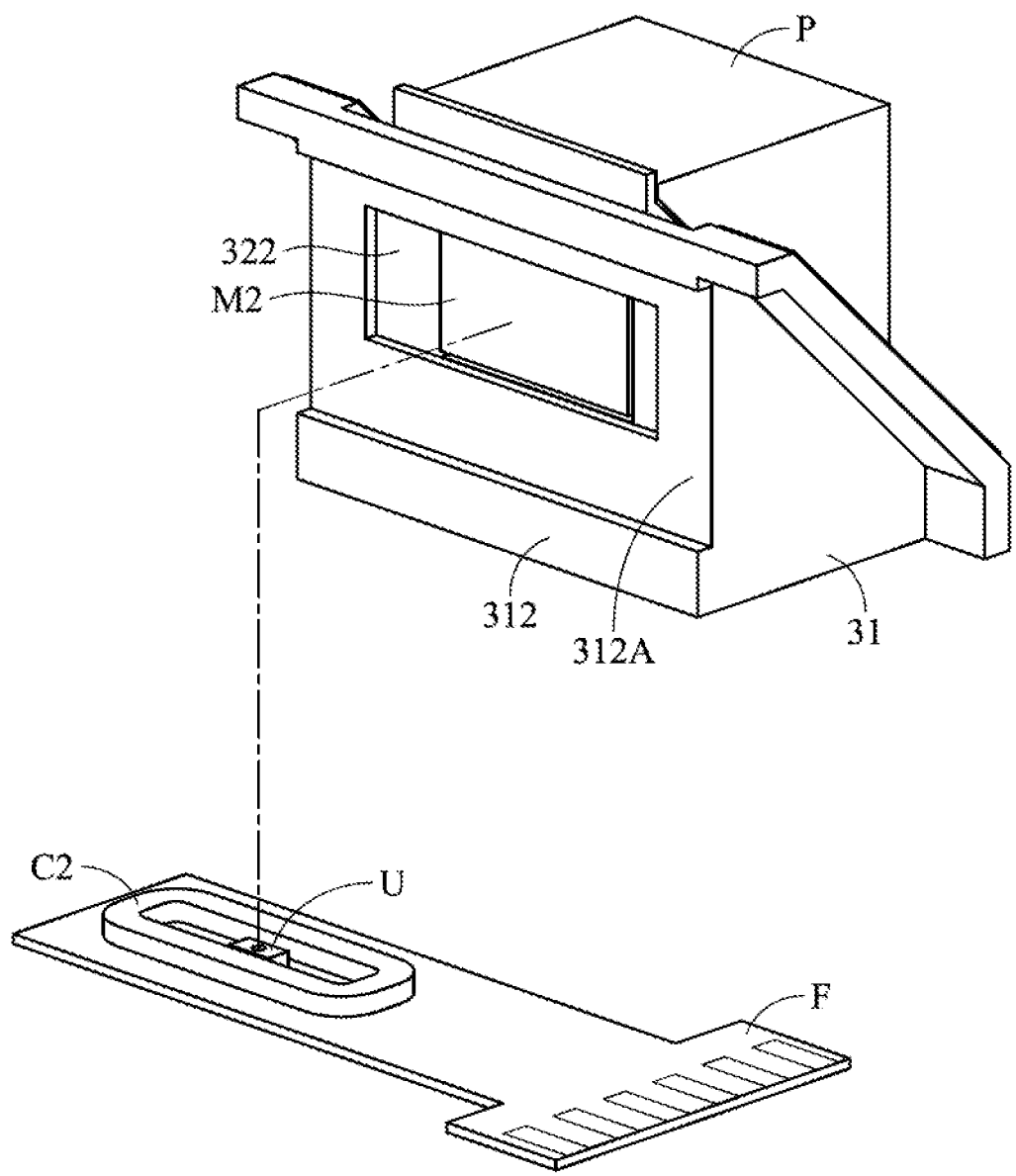
FIG. 4 is a schematic diagram of the base and the circuit board assembly (they are separated) in FIG. 2.

FIG. 4 shows a schematic view of the circuit board assembly F and the base 31 of the optical path adjusting mechanism 30 (in a separated state). The second electromagnetic driving assembly MC2 is disposed at the bottom of the base 31 and the holder 32. Specifically, the second electromagnetic driving assembly MC2 includes a second coil C2 (also called a coil assembly) and a second magnetic element M2 that correspond to each other and that are respectively disposed on the circuit board assembly F and the bottom surface 322 of the holder 32. The second coil C2 and the circuit board assembly F are affixed to each other, and the second magnetic element M2 and the holder 32 are affixed to each other (i.e., the optical path adjusting unit. P and the second magnetic element M2 are also affixed to each other). The circuit board assembly F is disposed on the bottom surface 312 of the base 31. As shown FIG. 4, the bottom surface 312 defines a recess 312A for receiving the circuit board assembly F which can be affixed to the base 31. When a driving signal is applied to the second coil C2 (e.g., the external power application signal through the circuit board assembly F), the holder 32 and the optical path adjusting unit P move together relative to the base 31 due to the magnetic force generated between the second coil C2 and the magnetic element M2. Therefore, the effect of the optical anti-shake is achieved by adjusting the incident angle of the incident light Q2 to the second optical element P via the optical path adjusting unit P.

It should be noted that the aforementioned optical path adjusting unit P and the second electromagnetic driving assembly MC2 are arranged along the Z-axis direction (the incident direction of the incident light Q2), and the second magnetic element M2 and the second coil C2 also are set up and down along the Z-axis. In one embodiment, the second magnetic element M2 is, for example, a multi-pole magnet. Compared with the mono-pole magnet, the magnetic force of the second magnetic element M2 is internally circulated and more closed, which can reduce the magnetic interference between the second magnetic element M2 and other circuit elements of the optical system 1. In some embodiments, the second magnetic element M2 may be a combination of two mono-pole magnets.

Figure 5:
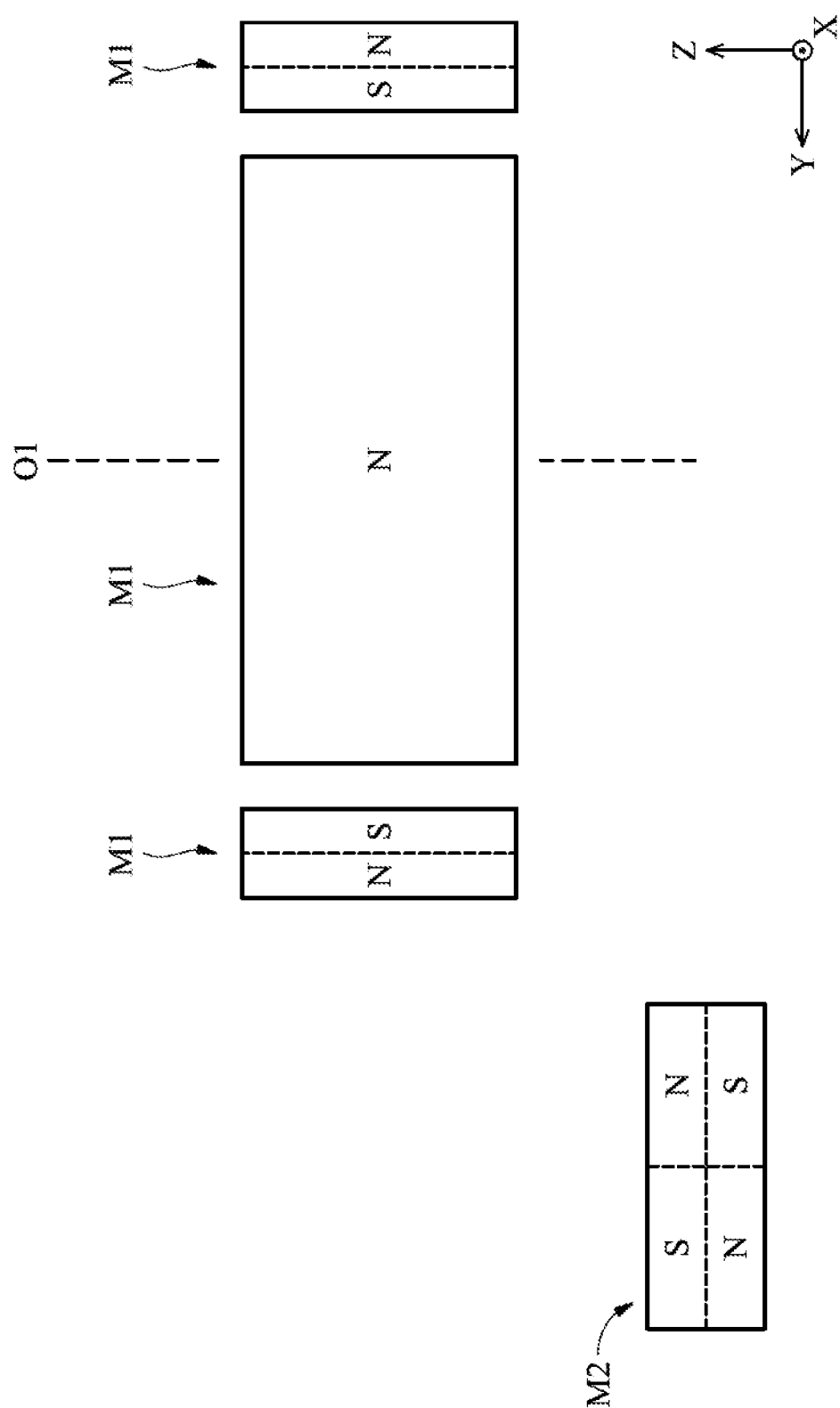
FIG. 5 is a schematic diagram of the arrangement of the first and second magnetic elements.

FIG. 5 shows the arrangement of the first magnetic element M1 of the first electromagnetic driving assembly MC1 (belonging to the first optical module 10) and the second magnetic element M2 of the second electromagnetic driving assembly MC2 (belonging to the optical path adjusting mechanism 30). As shown in FIG. 5, the magnetic pole direction of the first magnetic element M1 is along the X-axis or Y-axis directions (perpendicular to the first optical axis O1), and the magnetic pole direction of the second magnetic element M2 is along the Z-axis direction (parallel to the first axis O1 or the incident direction of the incident light Q2), wherein they are not parallel. In some embodiments, both are perpendicular to each other. In this way, compared to the manner in which the first and second magnetic elements M1 and M2 are arranged in parallel (the magnetic poles are in the same direction or along, the same axis), the arrangement of the magnetic elements (M1 and M2) have been changed, so that the degree of magnetic interference between the two is effectively reduced, to improve the overall system quality. In addition, when viewed in a direction perpendicular to the first optical axis O1 (i.e., the Y-axis direction), the first and second magnetic elements M1 and M2 do not overlap (that is, they are at different heights in the Z-axis direction). In this way, the problem of mutual electromagnetic interference due to being on the same plane can be reduced or avoided. As a result, in the case of a significant decrease in magnetic interference, the optical path adjusting mechanism 30 is able to be disposed closer to the first optical module 10, and the distance D1 (shown in FIG. 1) can be reduced. Therefore, the volume of the optical system 1 in the electronic device is reduced to achieve miniaturization.

Furthermore, the optical path adjusting unit P of this embodiment further includes a permeability element T and a position element U, as shown in FIGS. 3 and 4. The permeability element T is disposed between the optical path adjusting unit P and the second electromagnetic driving assembly MC2. In detail, it is disposed between the bottom surface 321 and the second magnetic element M2. By setting the permeability element T, the magnetic force of the second magnetic element 12 is concentrated in a predetermined direction to enhance the magnetic force that drives the holder 32 to move, and to reduce the effect of magnetic interference. In some embodiments, the permeability element T can be embedded in a portion of the bottom surface 321 of the holder 32 corresponding to the second magnetic element M2 (so that the bottom surface 321 has a permeability material), and the second magnetic element M2 is directly contacted and affixed to the bottom surface 321. Besides increasing the magnetic force (between the second magnetic element M2 and the second coil C2) in a predetermined direction, the overall mechanical strength of the holder 32 can be enhanced.

The position element U can be a position sensor, for example, a magnetoresistive sensor (MRS) or an optical sensor, for sensing the positional relationship of the holder 32 and the optical path adjusting unit P relative to the base 10, so that the relative position of the holder 32 carrying the optical path adjusting unit P and the base 10 can be adjusted by the second electromagnetic driving assembly MC2 (for example, the position element U transmits a signal to a control unit, and the control unit controls the external power supply, applying an appropriate current to the second electromagnetic driving assembly MC2 according to the signal). It is worth noting that the position element U is disposed in the hollow portion of the second coil C2. In other words, the position element U is surrounded by the second coil C2. This configuration can help achieve miniaturization of the entire mechanism. In this embodiment, the position element U can share the second magnetic element M2 with the second coil C2.

Figure 6A:
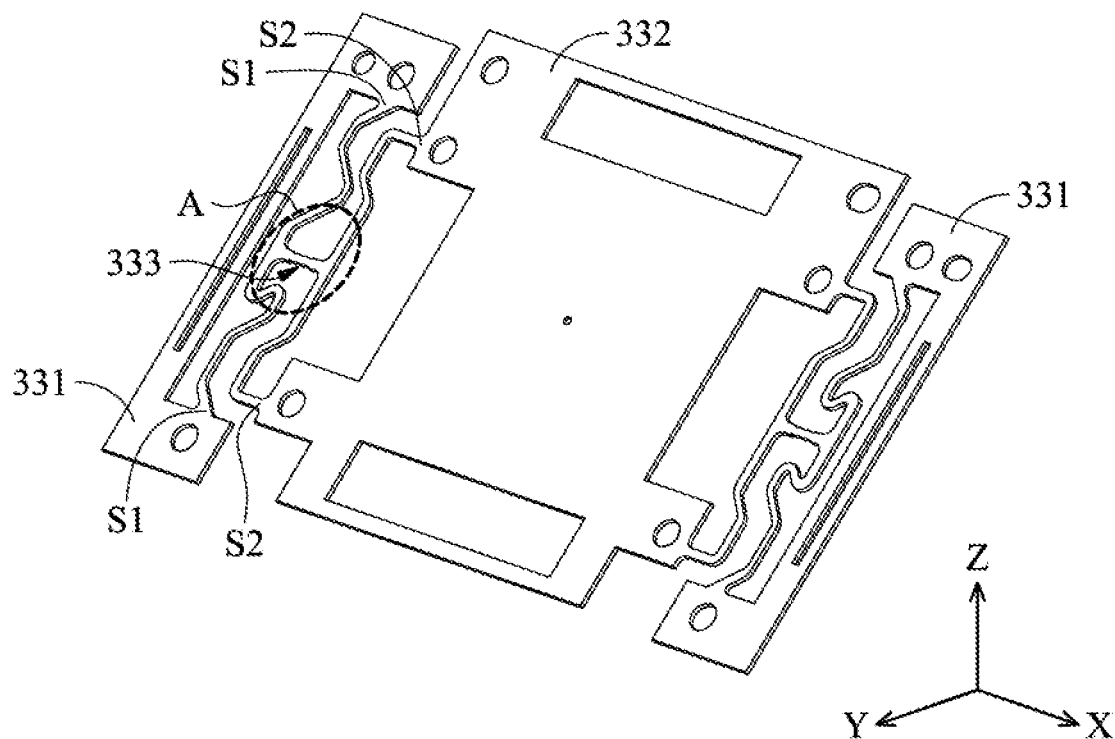
FIG. 6A is a schematic diagram of the elastic element.
Figure 6B:
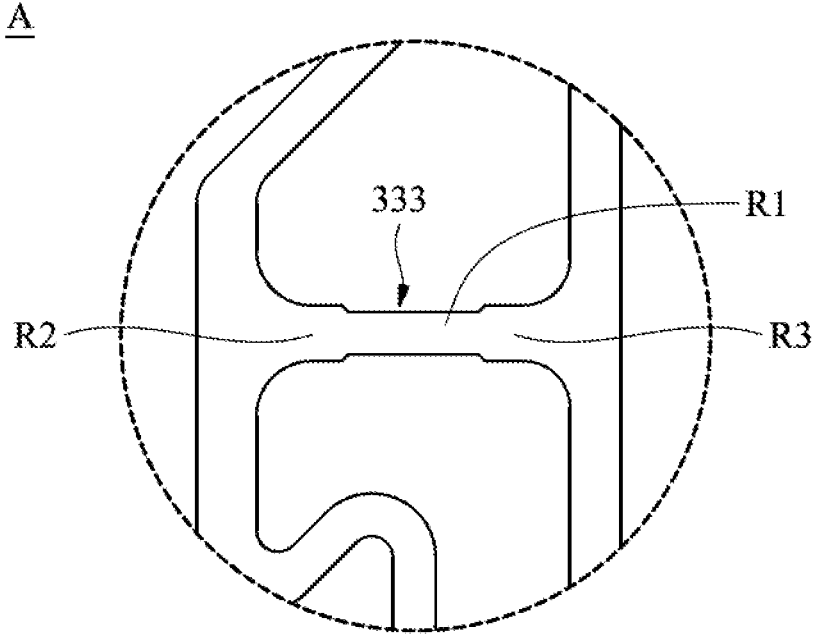
FIG. 6B is an enlarged view diagram of the area A in FIG. 6.

FIG. 6A is a schematic view of the elastic element 33. The elastic element 33 is disposed on the base 31 and the holder 32 and between the optical path adjusting unit P and the holder 32 (FIG. 2B). Before the applying the driving signal, the bolder 32 and the optical path adjusting unit P remain in an initial position relative to the base 31 via the elastic element 33. It should be noted that the elastic element 33 has a fixed portion 331 and a movable portion 332 which are respectively connected to the base 31 and the holder 32. The left half portion of the elastic element 33 is described as an example. The fixed portion 331 has two first string-out ends S1, and the movable portion 332 has two second string-out ends S2, wherein the connecting distance between the two first string-out ends S1 is greater than the connecting distance between the two second string-out ends S2. Therefore, the strength of the elastic element 33 affixed to the base 31 can be enhanced, and the mobility of the holder 32 (relative to the base 30 also be increased. In addition, the elastic element 33 further includes a connecting portion 333 substantially perpendicular to the incident direction of the incident light Q2 and having a narrow section R1. As shown in FIG. 6B, the width of the narrow section R1 is smaller than the junction R2 between the connecting portion 333 and the fixed portion 331, and it is also smaller than the junction R3 between the connecting portion 333 and the movable portion 332. In other words, there is a step in width between the connecting portions R2 and R3 and the narrow portion R1, which allows the elastic element 33 to have a better effect of dispersing the stress and improving the quality of the device.

Figure 7:
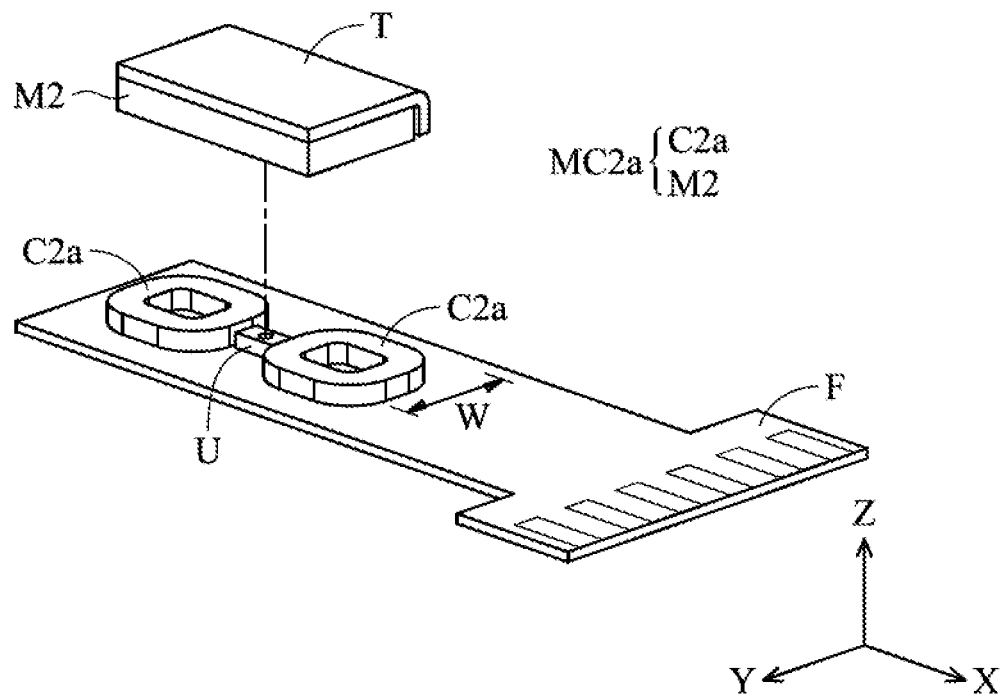
FIG. 7 is a schematic diagram of an electromagnetic driving assembly disposed on the circuit board assembly according to another embodiment of the invention.

FIG. 7 shows a second electromagnetic driving assembly MC2a of another embodiment of the present invention. The main difference between the second electromagnetic driving assembly MC2a in this embodiment and the aforementioned second electromagnetic driving assembly MC2 is that the second electromagnetic driving assembly MC2a has a plurality of (for example, two) second coils C2a corresponding to the second magnetic element M2, and the position element U is disposed between two second coils C2a. Since the position element U is no longer placed in the hollow portion inside the coil, the thickness W (Y-axis direction) of the second coil C2a can be smaller than the second coil C2 of aforementioned embodiment. In addition, the two second coils C2a of this embodiment are electrically independent of each other, and they can be applied with driving signals independently, and a plurality of different driving signals are applied to the second coil C2a via the external power supply to make the second coil C2a be independently controlled, and they generate magnetic forces with the second magnetic element M2 where those forces are the same or different in direction and size. For example, when two second coils C2a are input with driving signals of the same size and the same direction and magnetic forces are generated between the second coils C2a and the second magnetic element M2, the holder 32 and the optical path adjusting unit P can be rotated in the X-axis relative to the base 31. When the same size and different directions of driving signals are input, the holder 32 and the optical path adjusting unit P can be rotated in the Z axis direction relative to the base 31. In this way, the holder 32 and the optical path adjusting unit P can be rotated in different axial directions.

Figure 8:
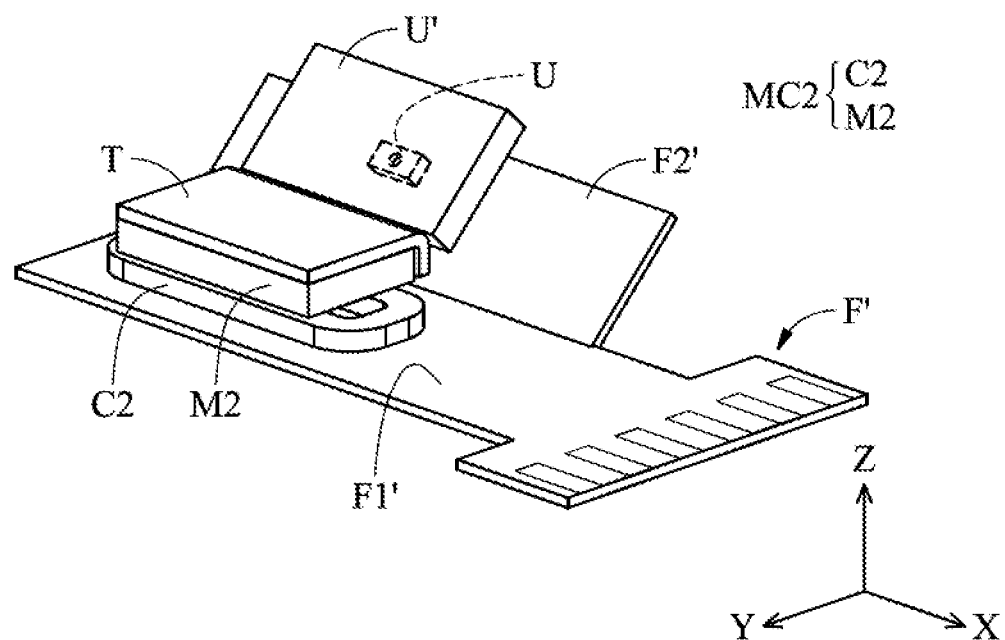
FIG. 8 is a schematic diagram of the arrangement of the circuit board assembly, position element and electromagnetic driving assembly according to another embodiment of the invention.

FIG. 8 shows a schematic view of a circuit board assembly F', a pair of position elements U and U', and a second electromagnetic driving element MC2 of another embodiment of the present invention. In this embodiment, the circuit board assembly F' has a body board F1' and a carrier board F2'. The carrier board F2' is angled (inclined) relative to the body board F1'. The second coil C2 is disposed on the body board F1'. The position element U is disposed on the carrier board F2' instead of being disposed in the hollow portion of the second coil C2. The body board F1' is perpendicular (or substantially perpendicular) to the incident direction of the incident light Q2 or the magnetic pole direction (Z-axis) of the second magnetic element M2, and the carrier board F2' is angled (inclined) relative to the incident direction of the incident light Q2 or the magnetic pole direction of the second magnetic element M2 (Z-axis). The foregoing position element U corresponds to another position element U' (which may be disposed on the holder 32), and they can compose a position assembly. Disposing the position elements U and U' at an angle relative to the magnetic pole direction of the second magnetic element M2 and no longer sharing the second magnetic element M2 with the second coil C2 can reduce or prevent decreases in the driving force of the second electromagnetic driving assembly MC2, which can improve the accuracy of sensing the relative positions of the holder 32 (where the optical path adjusting unit P disposed) and the base 31.

In summary, the present invention provides an optical system that can be disposed in an electronic device, including a first optical module, a second optical module, and an optical path adjusting mechanism. The first and second optical modules are respectively configured to sustain a first optical element and a second optical element. The first and second optical elements respectively have a first optical axis and a second optical axis which are perpendicular to each other. The first optical module has a first electromagnetic driving assembly. The optical path adjusting mechanism is disposed between the first and second optical modules and guides an incident light to the second optical module. The optical path adjusting mechanism includes an optical path adjusting unit and a second electromagnetic driving assembly, wherein the optical path adjusting unit and the second electromagnetic driving assembly are arranged along the incident direction of the incident light. Furthermore, the first and second electromagnetic driving assemblies respectively have a first magnetic element and a second magnetic element, and the magnetic pole directions of the two are not parallel. As a result, the foregoing configuration can reduce the magnetic interference between the two electromagnetic driving assemblies in the optical system. Therefore, the magnetic driving force can be effectively increased, and the optical path adjusting mechanism can be set closer to the second optical module (under conditions of low magnetic interference), so that the overall volume of the optical system is reduced to achieve miniaturization. In addition, the optical path adjusting unit and the second electromagnetic driving assembly are arranged along the incident direction of the incident light, which can also allow the other components in the electronic device to be disposed flexibly.

Use of ordinal terms such as "first", "second", "third", etc., in the claims to modify a claim element does not by itself connote any priority precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention.

It is intended that the standard and examples be considered as exemplary only, with the true scope of the disclosed embodiments being indicated by the following claims and their equivalents.

What is claimed is:

1. An optical system, comprising:
   a first optical module, configured to sustain a first optical element having a first optical axis, and the first optical module includes a first electromagnetic driving assembly;
   a second optical module, configured to sustain a second optical element having a second optical axis which is perpendicular to the first optical axis; and
   an optical path adjusting mechanism, corresponding to the second optical module and adjacent to the first optical module, configured to allow light to enter the second optical module, wherein the optical path adjusting mechanism includes an optical path adjusting unit and a second electromagnetic driving assembly,
   wherein the second electromagnetic driving assembly includes:
   a second magnetic element;
   a coil, corresponding to the second magnetic element; and
   a permeability element, configured to adjust the magnetic force distribution of the second magnetic element, wherein the second magnetic element is disposed between the coil and the permeability element;
   wherein when viewed along the arrangement direction of the coil and the permeability element, the second magnetic element at least partially overlaps the permeability element, and the light which enters the optical path adjusting mechanism overlaps the permeability element, and the second optical axis does not intersect the permeability element.

2. The optical system as claimed in claim 1, wherein the first electromagnetic driving assembly includes a first magnetic element, and the magnetic pole directions of the first magnetic element and the second magnetic element are not parallel to each other.

3. The optical system as claimed in claim 2, wherein the magnetic pole direction of the second magnetic element is parallel to the first optical axis.

4. The optical system as claimed in claim 2, wherein the magnetic poles of the first magnetic element and the second magnetic element are perpendicular to each other.

5. The optical system as claimed in claim 2, wherein the first magnetic element and the second magnetic element do not overlap when viewed from the direction perpendicular to the first optical axis.

6. The optical system as claimed in claim 1, wherein the permeability element is disposed between the optical path adjusting unit and the second element and coil.

7. The optical system as claimed in claim 2, wherein the optical path adjusting mechanism further includes a circuit board assembly and a position element, wherein the position element and the coil are disposed on the circuit board assembly, and the second magnetic element is disposed on the optical path adjusting unit and corresponds to the coil.

8. The optical system as claimed in claim 7, wherein the optical path adjusting mechanism further includes a holder and a base, the base is affixed to the circuit board assembly and configured to receive the holder, and the holder sustains the optical path adjusting unit.

9. The optical system as claimed in claim 8, wherein the optical path adjusting mechanism further includes an elastic element disposed between the optical path adjusting unit and the holder, and the elastic element is connected to the optical path adjusting unit, the holder, and the base.

10. The optical system according to claim 9, wherein the holder and the base respectively have two inclined surfaces angled relative to the incident direction of the light, and the elastic element is disposed on the inclined surfaces.

11. The optical system as claimed in claim 9, wherein the elastic element has a fixed portion and a movable portion respectively connected to the base and the holder, the fixed portion has two first string-out ends, and the movable portion has two second string-out ends, wherein the connection distance of the two first string-out ends are greater than the connection distance of the two second string-out ends.

12. The optical system as claimed in claim 11, wherein the elastic element further includes a connecting portion connecting the fixed portion to the movable portion, and the connecting portion is perpendicular to the incident direction of the light and has a narrow portion, wherein the width of the narrow portion is smaller than the width of the junction between the connecting portion and the fixed portion and the junction between the connecting portion and the movable portion.

13. The optical system as claimed in claim 7, wherein the coil has a hollow portion, the position element is surrounded by the coil, and the coil and the position element share the second magnetic element.

14. The optical system as claimed in claim 7, wherein the second electromagnetic driving assembly further includes a plurality of coils corresponding to the second magnetic element, and the coils are electrically independent of each other.

15. The optical system as claimed in claim 14, wherein the position element is disposed between the coils.

16. The optical system as claimed in claim 7, wherein the position element and the coil are disposed on the different surfaces of the circuit board assembly.

17. The optical system as claimed in claim 16, wherein the circuit board assembly has a body board and a carrier board, and the coil and the position element are respectively disposed on the body board and the carrier board, wherein the carrier board is angled relative to the incident direction of the light.

18. The optical system as claimed in claim 1, wherein the second electromagnetic driving assembly further includes a position element for sensing the movement of the optical path adjustment unit, and the second magnetic element is located between the permeability element and the position element;
   wherein when viewing the arrangement direction of the position element and the permeability element, the second magnetic element at least partially overlaps the permeability element.

19. The optical system as claimed in claim 18, wherein the permeability element has a plate-like structure and extends along a plane perpendicular to the first optical axis.

20. The optical system as claimed in claim 19, wherein the permeability element extends along a plane perpendicular to the second optical axis.

* * * * *